H. R. BONNY.
MACHINE FOR TREATING FLAX AND OTHER FIBROUS PLANTS.
APPLICATION FILED JULY 19, 1915.

1,241,703.

Patented Oct. 2, 1917.
3 SHEETS—SHEET 2.

H. R. BONNY.
MACHINE FOR TREATING FLAX AND OTHER FIBROUS PLANTS.
APPLICATION FILED JULY 19, 1915.
1,241,703.
Patented Oct. 2, 1917.
3 SHEETS—SHEET 3.
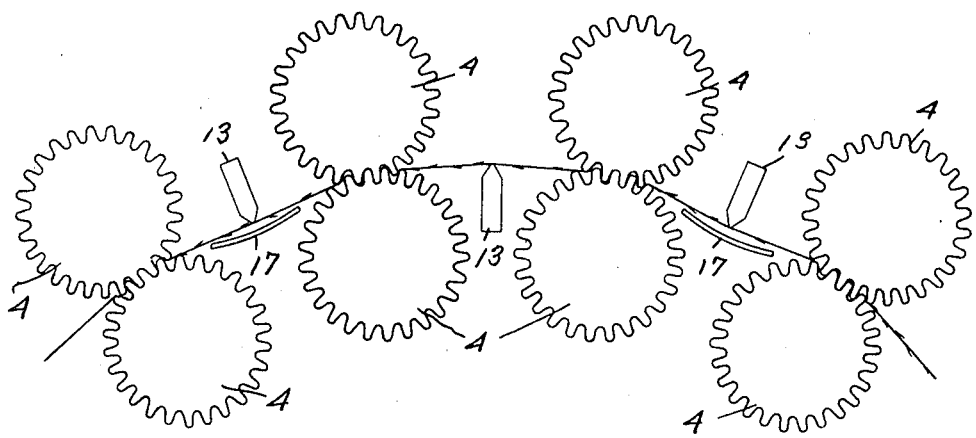
Fig. 3.
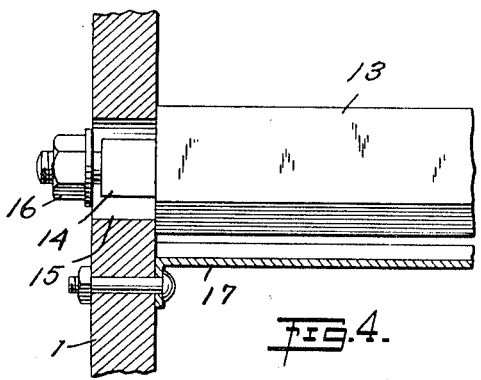
Fig. 4.
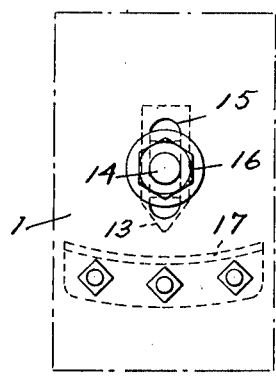
Fig. 5.
Fig. 6.
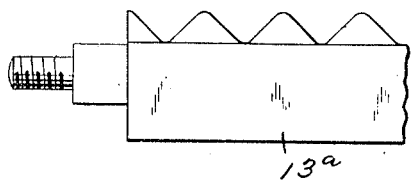
Fig. 7.
Witness
G. Robert Thomas

UNITED STATES PATENT OFFICE.

HOWARD ROGERS BONNY, OF NEW YORK, N. Y.

MACHINE FOR TREATING FLAX AND OTHER FIBROUS PLANTS.

1,241,703.   Specification of Letters Patent.   Patented Oct. 2, 1917.

Application filed July 19, 1915. Serial No. 40,603.

*To all whom it may concern:*

Be it known that I, HOWARD ROGERS BONNY, a citizen of the United States, and a resident of the borough of Manhattan, in the city, county, and State of New York, have invented certain new and useful Improvements in Machines for Treating Flax and Other Fibrous Plants, of which the following is a specification.

This invention relates to machines for treating fibrous plants, such as flax, hemp, jute and similar growths but more especially flax, for separating their component parts for use in the industrial arts.

The object of my improvements is to furnish a machine into which the flax plants as gathered in the fields may be treated in one operation which will de-seed and de-shive the plants into their separate parts of seed, fiber, and shive. The special object is to effect a thorough separation of the shive from the fiber, so that the latter is obtained in a superior condition for subsequent treatment and use.

In the drawings:

Fig. 3 is an enlarged diagrammatic side view of a portion of the machine;

Fig. 4 is an enlarged fragmentary sectional view showing the relation and mounting of a stripping plate and a coöperating guide plate;

Fig. 5 is a side view of Fig. 4;

Fig. 6 is a fragmentary elevation of another form of stripping plate; and

Fig. 7 is a transverse section through the same.

Figure 1:
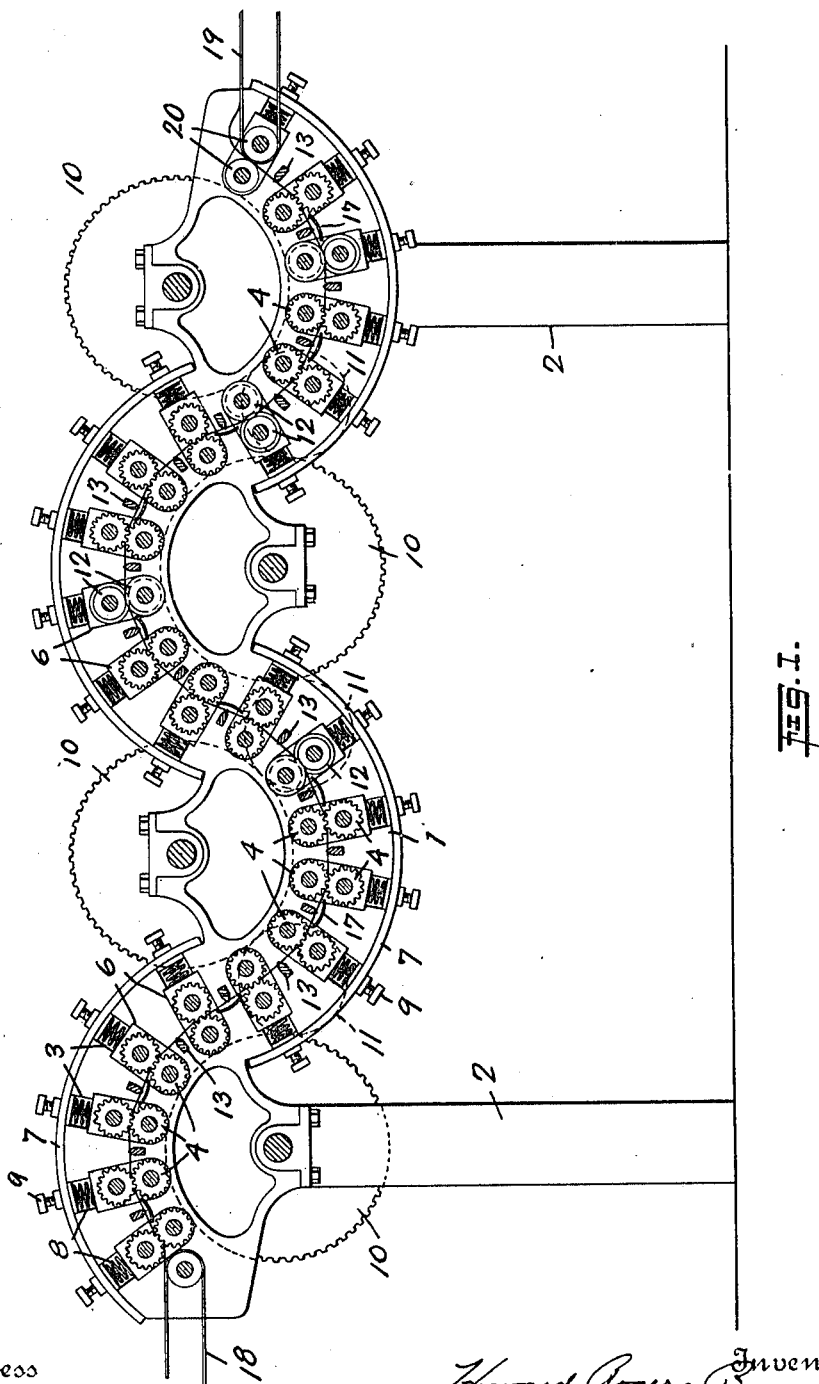
Figure 1 is a vertical longitudinal section through the preferred embodiment of the machine.
Figure 2:
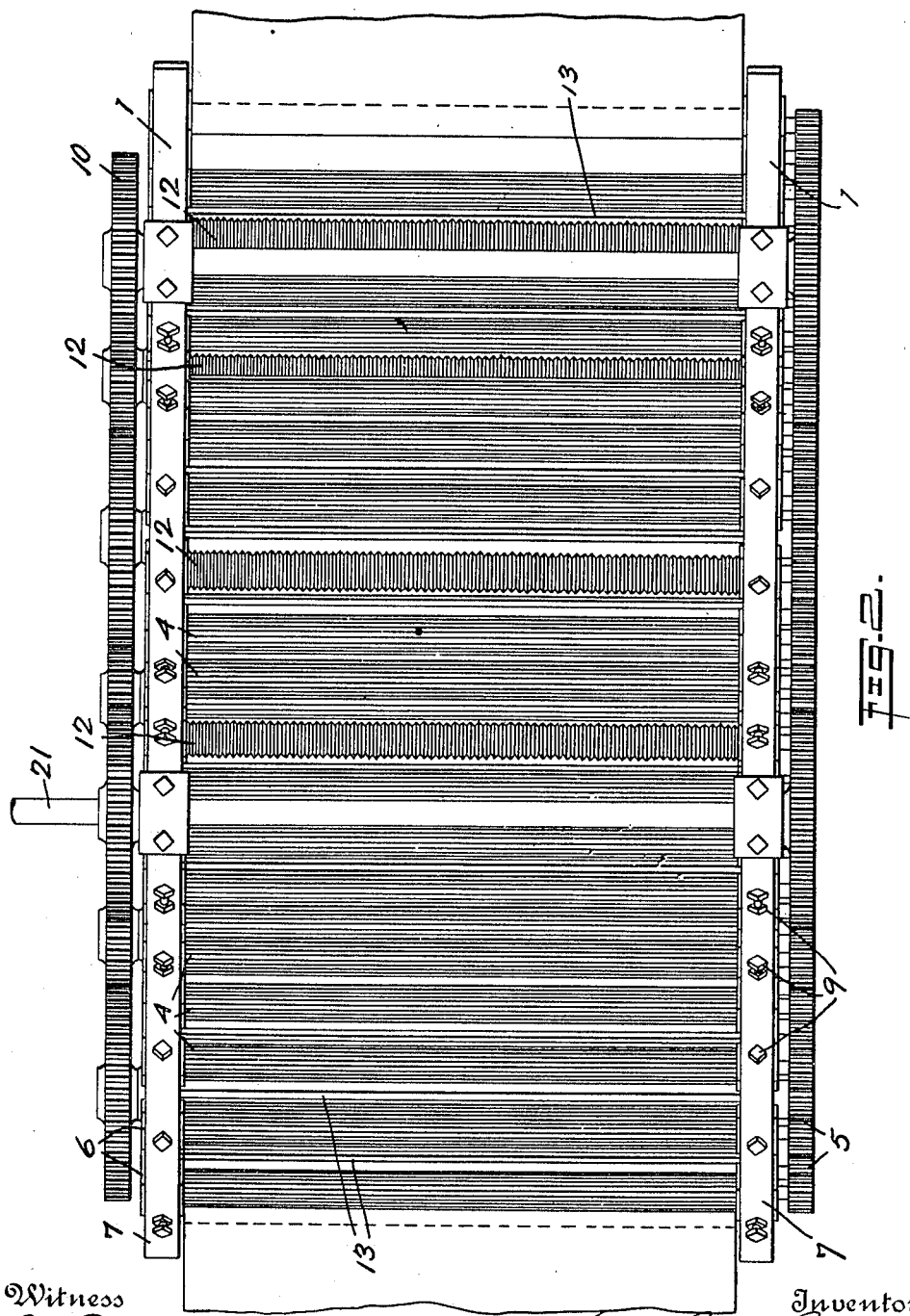
Fig. 2 is a plan view.

The machine comprises two side frames 1 supported rigidly by end legs or supports 2. These frames have jaws 3 at suitable intervals, which carry the fluted decorticating rolls 4, of which there may be twelve pairs and upward. The flutes of these rolls run lengthwise and intermesh. The rolls are of uniform diameter on their pitch line, but may vary in the size and number of flutes as preferred. They are in pairs in each jaw, and are driven by pinions 5 of equal diameter, but are so spaced that the flutes do not come in contact during their revolution. Suitable box bearings 6 for the journals of the rolls are held in place in the jaws by straps 7 attached to the side frames, and over each set of boxes a spring 8, suitably tensioned by a screw 9, permits of movement in one roll of each pair, in order to pass any accumulation of plants without injury to the fiber.

The pairs of rolls are arranged in curves or segments of a circle, which are reversed with respect to each other, so that the pairs of rolls form a sinuous or ogee series, with the object of producing a continuous bending action on the plants as they travel through the machine.

The rolls of each segment may advantageously be driven by a common spur wheel 10, uniform speed being maintained by means of idle spur wheels 11, which mesh with the drivers of the several segments.

At one or more points on the train of fluted rolls circumferentially corrugated or grooved rolls 12 are substituted, with the object of separating and deflecting the fibers to permit of the shive dropping downward. In these rolls, also, the ridges of one roll of each pair are opposite or project into the grooves of the other but do not touch. Their specific form may be somewhat varied, but a substantially triangular or V shaped formation of the ridges and grooves is satisfactory.

Between the pairs of rolls, or between a certain number thereof, stripping plates 13 are inserted. Their working edges are preferably narrow and somewhat rounded, and in the typical construction are straight, though stripping plates 13ª having serrated, grooved, or notched edges may be employed for certain purposes, as represented for example in Figs. 6 and 7. The said plates are held in position by suitable attachment to the side frames. As shown, their ends are provided with projections 14 received slidably in slots 15 in the side frames and adapted to be fixed at the desired point by nuts 16, though naturally the specific means of adjustment may be varied. In this way their working edges can be caused to intersect more or less the path of the plants between the bite of adjacent pairs of rolls, or can be withdrawn out of action entirely. In the typical working condition the plates are so positioned that their edges project slightly beyond the direct line, say about one-sixty-fourth (1/64) of an inch, the degree of intersection being such as to insure a substantial rubbing or scraping action without obstructing the passage of the straw through the machine. The degree of intersection by the plates may vary at different points along the path of travel if conditions are such as to make this desirable, and any one or more of the plates may be placed out of action, depending upon the amount of scraping or rubbing to which it is desired to subject the fibers or the points in the path of travel at which the action is to be exerted.

Part of the stripping plates are disposed above the passing web of plants and part below, and as shown it is desirable to alternate them in this respect. By this arrangement the fibers are acted upon first at one side and then at the other, thereby dislodging the pieces of shive in a particularly effective manner. In conjunction with each of the stripping plates which are disposed above the plants as they travel through the rolls, a curved plate 17 is provided directly beneath, to guide the material to the intake of the succeeding pair of rolls.

At the feeding and delivery end of the machine suitable feeding and delivery aprons 18 and 19, traveling at the same speed as the rolls, are attached and are driven by gearing meshing with the roll pinions. In the machine as it is preferably organized, the feeding apron 18 delivers to the end of an arch roll segment, and the delivery belt receives the fibers from the end of an inverted segment. As shown, the delivery apron 19 passes about one member of a pair of plain delivery rolls 20 arranged as the terminal pair of rolls in the sinuous series. Power is applied at the extension 21 of the shaft of one of the driving wheels 10.

To operate the machine the flax is fed by the feeding apron into the first pair of rolls, and as it passes through these the seed is removed and falls into a suitable receptacle, which is not here shown. The plants as they travel through the succeeding pairs of fluted rolls are bent by the flutes without injury to the fiber, thereby fracturing and splitting the brittle wood of the stalks, which falls into a second receptacle. The sinuous course in which the plants are compelled to travel, by reason of the disposition of the rolls in reversed curves or segments, greatly favors the separation and disengagement of the shive or woody element. As the stalks are drawn over the edges of the stripping plates the particles of broken shive which adhere to the fiber are scraped or rubbed off. In this way a serious defect of prior decorticating apparatus and procedures is overcome. The circumferentially corrugated ridges or grooved rolls disposed at one or more suitable points contribute to the effectiveness of the separation by opening up or dividing the web of fibers, so that bits of shive can drop out. Serrated plates may be used to break the fiber, which is desirable if the object is the production of tow. For all ordinary purposes, however, straight-edged stripping plates are employed, which do not break the fiber.

What I claim as new is:

1. In a machine of the character described, the combination with decorticating rolls, of stripping plates placed between the rolls and over which the fibers are drawn to remove adhering shive, and means for causing said plates to intersect in variable degree the path of the fiber between rolls.

2. In a machine of the character described, the combination with pairs of decorticating rolls, of a stripping plate disposed between adjacent pairs, and a curved guide opposite the working edge of the stripping plate to direct the fibers into the bite of the succeeding pair of rolls.

3. In a machine of the character described, the combination of a plurality of pairs of decorticating rolls arranged in a sinuous series, and stripping plates disposed between the pairs of rolls.

4. In a machine of the character described, the combination of a plurality of pairs of decorticating rolls arranged in a sinuous series, stripping plates disposed between the pairs of rolls alternately above and beneath the passing webs of plants, and curved guides opposite the working edges of the stripping plates which are above.

HOWARD ROGERS BONNY.